United States Patent [19]

Rehder et al.

[11] Patent Number: 4,525,388

[45] Date of Patent: Jun. 25, 1985

[54] PROCESS FOR EXPANDING AND COATING PERLITE

[75] Inventors: Thomas E. Rehder, Mundelein; Terrance L. Williams, Crystal Lake, both of Ill.

[73] Assignee: USG Corporation, Chicago, Ill.

[21] Appl. No.: 565,198

[22] Filed: Dec. 23, 1983

[51] Int. Cl.³ .................. B05D 3/02; B05D 3/04; B05D 7/00

[52] U.S. Cl. ............... 427/221; 252/378 P; 427/377; 427/387; 428/405; 428/407

[58] Field of Search ............ 427/215, 221, 387, 377; 428/405, 407; 252/378 P

[56] References Cited

U.S. PATENT DOCUMENTS 4,183,980  1/1980  Nielsen .................. 252/378 P
4,255,489  3/1981  Nielsen .................. 252/378 P Primary Examiner—Michael R. Lusignan
Attorney, Agent, or Firm—Robert H. Robinson; Kenneth E. Roberts; Samuel Kurlandsky

[57] ABSTRACT

Expanded perlite is produced while simultaneously or substantially simultaneously coating the expanded perlite with an hydrophobic coating material by passing the expanded perlite and heated expander exhaust gases from the expansion chamber through a cooling and coating chamber provided with spray nozzles to provide a stream of atomized coating material onto the expanded perlite, while upstream thereof an air intake and temperature sensor are situated to control the air flow and temperature in the cooling and coating chamber so as to provide proper curing temperatures for the coating material upon the expanded perlite before it is separated from the exhaust gases.

9 Claims, 2 Drawing Figures

PROCESS FOR EXPANDING AND COATING PERLITE

BACKGROUND OF THE INVENTION

1. Field of the Invention

This invention relates to the production of silicone coated expanded perlite, and more particularly to a method of coating extremely lightweight particles of expanded perlite virtually simultaneously with their expansion from perlite ore.

The present invention provides an expanded perlite coated with a cured hydrophobic material such as polydimethyl siloxane in a highly efficient manner. Perlite is an ore of volcanic origin that has the unusual characteristic of expanding to about 4-20 times its original volume upon quickly heating within its softening-temperature range (generally 760°-1100° C.).

2. Description of the Prior Art

Processes for expanding perlite are disclosed in U.S. Pat. No. 2,455,666; 2,501,699; 2,572,483; 2,621,160; and 3,097,832 and are otherwise generally known in the art. In recent years, interest has developed in extremely lightweight and in finer grades of expanded perlite having very low bulk densities e.g. less than about 160 kg/m$^3$, and increased surface areas, e.g. top particle size of around 150 micrometers or less, for use as a filler in paints, textures, joint compounds, plastics and the like. Furthermore the surfaces of expanded perlite particles contain many fine cracks and fissures. The production of these lower bulk weight and finer particle size perlite materials results in increased fissuring of the particles. When placed in contact with water, such as in aqueous dispersion paints, textures and joint compounds, the water penetrates the cracks and fissures and enters into the interior air filled cavities of the perlite, causing it to lose its lightweight characteristic. Further, the entrained water may be detrimental to processing plastics or other formulations which might otherwise use this lightweight filler.

Applying coatings on expanded perlite particles to seal the surfaces thereof is not per se unique to the present invention. U.S. Pat. No. 3,769,065 discloses a process of coating expanded in a prior separate operation by applying an aqueous acid solution to the particles, then applying an aqueous sodium silicate solution followed by another acid treatment, and drying the coated particles. U.S. Pat. Nos. 4,183,980 and 4,255,489 disclose a strengthened coated expanded perlite obtained by contacting the previously expanded perlite with an emulsion of polysiloxane, drying the coated particles as in a moving stream of hot gas, and then a further extended heat treatment in an oven at a temperature of 288°-454° C. to cure and strengthen the polysiloxane.

Other means of coating expanded perlite separate and apart from the production of the expanded perlite are known, such as vat soaking in a coating solution followed by draining, drying and curing; and pouring or spraying onto a tumbling bed followed by drying and curing. Coatings of other filler materials are also known, with U.S. Pat. No. 4,141,751, for example, disclosing spraying either a silane or titanate coupling agent onto fine particulate inorganic solids, while agitating those solids in a high intensity mixer to develop shearing friction temperatures for curing, and drying the coated particles. U.S. Pat. No. 2,730,841 discloses the production of silicone coated glass beads by spraying a siloxane dispersion onto hot glass beads after they have been separated from formation exhaust gases, and allowing the coated beads to cure from 2 to 24 hours on exposure to ambient air.

SUMMARY OF THE INVENTION

The essence of the present invention is an improvement in a perlite expansion system, whereby a section is added just after the conventional perlite expansion chamber to provide for the simultaneous or substantially simultaneous coating and curing of a hydrophobic compound onto the hot, just formed, expanded perlite entrained in the exhaust gases of the expander. By utilizing the hot exhaust gases from the expander for curing and coating, a highly efficient and rapid method for coating and curing expanded perlite is provided. Prior art coating processes appear to be capital, labor and energy intensive in that additional handling of the expanded perlite, additional treatment vessels and additional time and energy to apply, dry and cure the coating is necessary.

Basically, the method of the present invention comprises the expansion of perlite ore in the usual manner, namely by introducing a stream of unexpanded perlite ore particles and a stream of hot gases at a temperature above the softening temperature of the perlite and at a velocity that will levitate expanded perlite but not unexpanded perlite into an expansion zone, then withdrawing hot expanded perlite suspended in the stream of hot exhaust gases and passing them to a separation zone to separate the perlite from the exhaust gases. The improvement of this invention comprises spraying an hydrophobic coating such as a silicone coating onto the air-conveyed perlite after the expansion zone when it is at a temperature between about 90° C. and about 375° C. and continuing to convey the coated perlite at such temperatures for at least a few seconds to dry and cure the coating. Preferably a cooling and coating chamber is provided to accomplish this, said chamber comprising at least one spray nozzle to introduce the coating material, an air inlet to allow the entry of cool, ambient air, a damper to control the input of ambient air and temperature sensing and actuating control means, such as a thermocouple and thermostat, sensing the upstream temperature and controlling the relative opening of the damper.

It is therefore an object and advantage of the present invention to provide an improved method and apparatus for producing expanded perlite coated with a hydrophobic sealing compound. Other objects and advantages will become apparent from the ensuing description, reference being had to the accompanying drawings, in which.

DESCRIPTION OF THE PREFERRED EMBODIMENTS

In its most highly preferred form, the present invention is directed to coating and curing expanded perlite with a silicone compound integral with the process of producing the expanded perlite. The preferred silicone compounds are water dilutable emulsions of polydimethyl siloxane which are commercially available. More generally, various silicones may be used including organo-functional silanes having the general formula R-SiX$_3$ wherein R is selected from the group consisting of alkoxy and acetoxy such as acrylate, methacrylate, glycidoxy, epoxy propoxy, epoxy cyclohexyl and vinyl and X is selected from the group consisting of halogen, alkoxy and acetoxy. These silicones are hydrophobic film forming compounds which are available in aqueous or organic solvent solution, emulsion or dispersion forms. Particularly preferred silicone dispersions include water dilutable polydimethyl siloxane dispersions available from Dow Chemical Company under the designation Dow 347 and from General Electric Company under the designation G.E. SM-2138.

Figure 1:
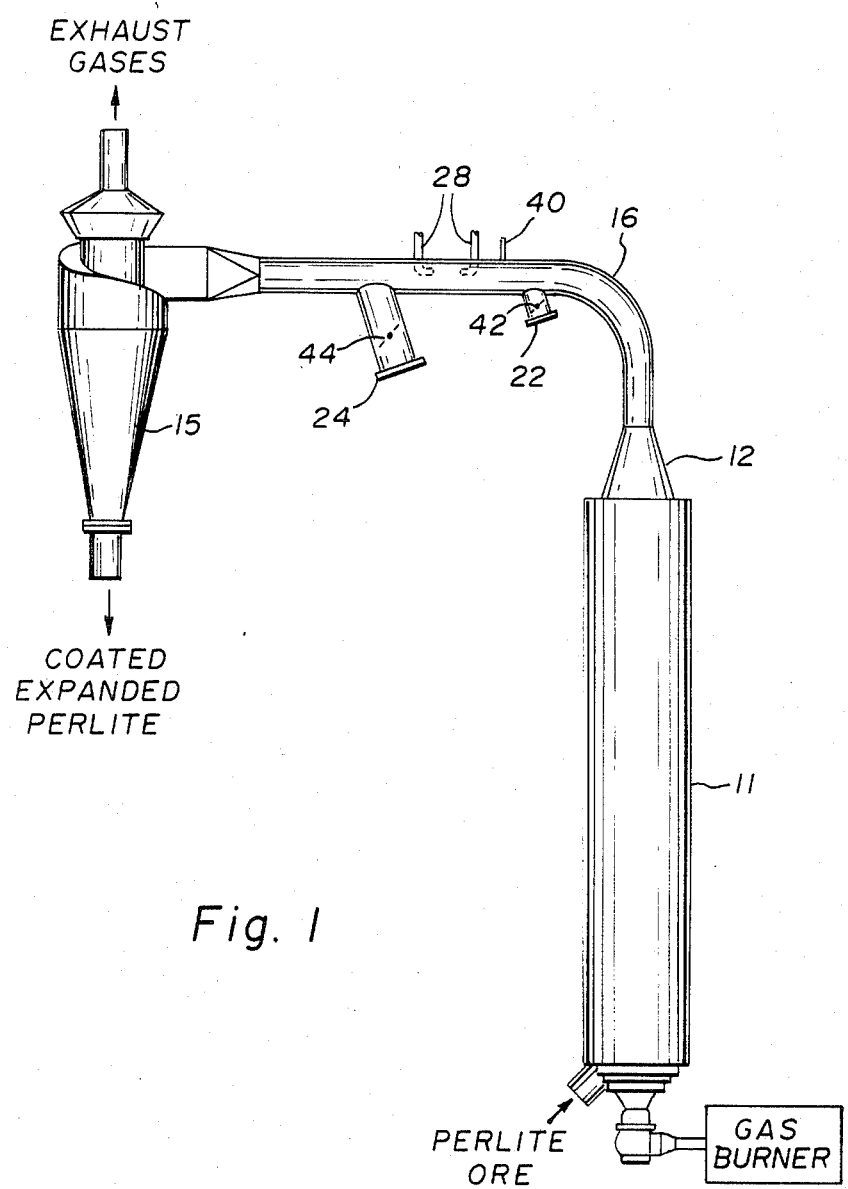
FIG. 1 is a schematic of a preferred embodiment of the process and apparatus embodying the present invention.

In one highly preferred embodiment, having reference to FIG. 1, unexpanded perlite ore and a source of hot combustion gases are provided to perlite expansion chamber 11, with the expanded perlite and hot exhaust gases exiting through duct 12 at around 760°–930° C. and entering duct 16 for passage to a particle separator such as cyclone 15 wherein the expanded perlite particles are separated from the exhaust gases. Intermediate the expansion chamber 11 and the cyclone 15, a small air intake 22 and optional larger air intake 24 are provided in duct 16. The air intakes are equipped with thermostatically 40 controlled dampers 42 and 44 so as to proportion entering ambient cooling air from the atmosphere with the hot exhaust gases to provide a temperature preferably between about 149° and 372° C. in the duct 16 between chamber 11 and the cyclone 15. Temperature sensing means 18 actuate spray nozzles 28 to provide an atomized coating of polydimethyl siloxane emulsion onto the expanded perlite particles. The coating dries and cures at these temperatures within a matter of seconds, usually with the time for the coated particles and exhaust gases to be air-veyed through duct 16 and into cyclone 15. If desired a baghouse separator can be substituted for cyclone 15.

The coated particles will dry and cure in a matter of seconds depending on the temperature in duct 16 and cyclone 15. The preferred polydimethyl siloxane coating of about 0.1–2 weight % will dry and substantially cure in about 3–5 seconds at exhaust gas temperatures of about 315° C., about 15 seconds at about 260° C., and about 30 seconds at about 205° C. Temperatures much above 370° C. at the time of coating are not preferred as exposure for more than a few seconds will tend to decompose the siloxane; and, for this coating material, temperatures below about 150° C. are not preferred for too much time is required to effectuate full curing. The length and diameter of, and gas velocity within, duct 16 are highly variable depending on the time and temperature desired for drying and curing the particular coating material on the air conveyed perlite. Of course, some curing continues to take place as the coated particles are separated from the exhaust gases in cyclone 15. Generally, the silicone coated perlite continues to cure for 3 or 4 seconds as the coated product cools below 150° C. as it proceeds from cyclone 15 to a packaging unit (not shown). Duct 16 may be insulated and/or externally heated to maintain any particular temperature for any preferred time of drying and curing.

Figure 2:
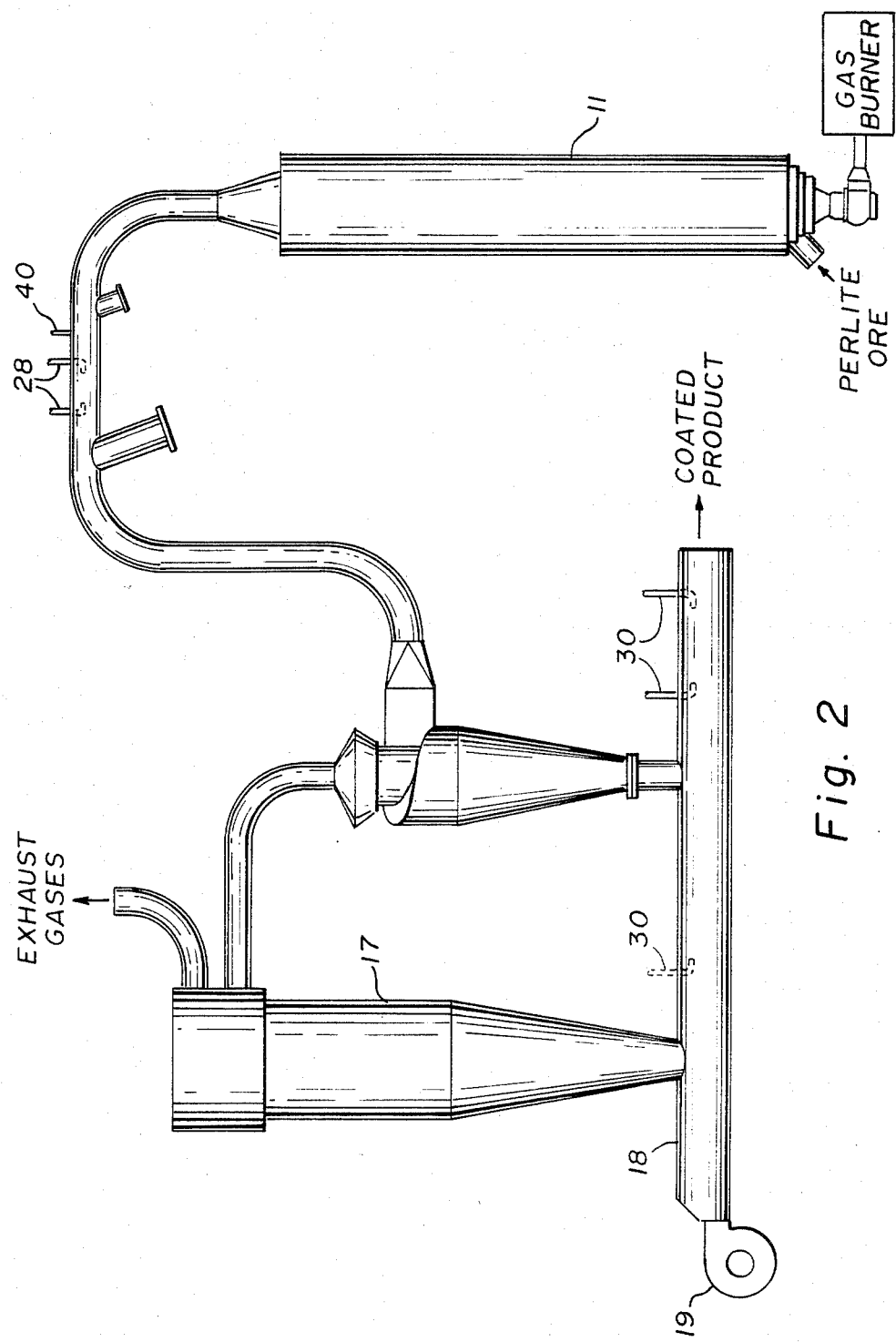
FIG. 2 shows a schematic of another embodiment which can be used with alternative spraying positions.

An alternative embodiment is shown in FIG. 2, and described more completely in Example 2, wherein hydrophobic coating compounds, which may degrade under conditions for the accelerated curing of silicone compounds, may be applied to either uncoated expanded perlite or a previously coated perlite in, or after, the particle separators shown as baghouse dust collector 17 and cyclone dust collector 15 to provide either some lessened measure of water resistance or additional protective features.

For example, aqueous or organic solvent solutions, dispersions or emulsions of other hydrophobic coating materials may be employed with aqueous solutions or dispersion forms being preferred due to concern over fire and vapor hazards. Suitable hydrophobic coating materials include, but are not limited to, long chain aliphatic fatty acids and salts having from about 12 to about 24 carbon atoms; such as stearic acid, calcium stearate, or other water dispersible ammonium, metallic or organic base salts of lauric, oleic, or palmitic acids. Low melt temperature, waxy-like members of the alkane paraffin series and/or low molecular weight polyalkylenes which are thin fluids at application temperatures of about 90°–375° C., including alkynes having from about 2 to 60 carbon atoms and molecular weights of from about 280 to 30,000 such as tretradecane, nonadecane and hexacontane, and polyethylene or polypropylene condensates having a molecular weight from about 280 to 30,000, may be used. Polyalkylene glycols having a molecular weight from about 700 through about 6000, particularly methoxy or ethoxy polyethylene glycols such as those available from Union Carbide under the trademark CARBOWAX may be used.

The concentration of the hydrophobic coating material in solution, emulsion or dispersion may vary widely. Generally those amounts which will provide on a dry weight basis from about 0.01 to about 4% hydrophobic solids material based on the weight of the perlite filler may be used.

The following specific examples will further illustrate various specific embodiments of the present invention. All amounts are expressed as parts by weight unless specified to the contrary. Of course, it is to be understood that these examples are by way of illustration only and are not to be construed as limitations on the present invention.

EXAMPLE 1

A very finely sized lightweight and water resistant expanded perlite for use in formulating water latex polymeric products of extended shelf life such as paints, textures and joint treatment compounds may be manufactured as shown in FIG. 1. Extremely finely ground perlite ore, at a rate of about 454 kg per hour, and a stream of hot gases from the flame of the gas burner, are fed to expansion chamber 11. The hot gases are at a temperature and velocity to levitate expanded perlite but not unexpanded ore out of the expansion chamber into transition duct 12 and coating chamber 16 at a velocity of 18–20 meters per second and a temperature of about 940°–950° C. The temperature of the exhaust gases carrying the expanded perlite is adjusted, by ambient air through intakes 22 and 24 to about 200°–260° C., preferably about 230° C. whereupon spray nozzles 28 may be activated to coat the particles with a silicone. A water dilutable polydimethyl siloxane dispersion, such as 60% silicone solids Dow SM 2138 silicone dispersion is diluted about 1 to 6 parts by weight and pressure injected into the duct through nozzles 28 at a rate of about 50 liters per hour. The moisture on the air conveyed, now coated perlite dries in 2–3 seconds as it continues to be conveyed and cool to below about 93° C. whereupon it is separated from the exhaust gases in cyclone 15. This results in an extremely water resistant lightweight perlite which may be immersed in water and will readily float and clearly separate from the water after months of storage.

EXAMPLE 2

In accordance with FIG. 2, perlite ore, sized to 97% passing 74 micrometers with a mean particle size of 14 micrometers was air conveyed into the bottom of expansion chamber 11 at a rate of about 544 kg per hour. The natural gas burner was set at 949° C. to provide a flame and hot gases into the expansion chamber 11. The expanded perlite was air-veyed through the chamber 11 via duct 16 and passed into a cyclone 15 followed by a bag type dust collector 17 to collect finer expanded perlite. The solids from both the cyclone 15 and the dust collector 17 were dropped into air duct 18 with auxiliary heating blower 19 where they are coated and transported to the packaging operations (not shown).

Aqueous emulsions of 6 parts water to 1 part polydimethyl siloxane solution were fed under pressure through spray nozzles 30 at approximately 13 liters of emulsion per hour for each nozzle. The upstream nozzle was directed with the flow of the expanded perlite while the downstream nozzle was approximately 3 m further downstream and was spraying against the flow to coat the expanded perlite. A kerosene flame space heater 19 was activated at the air intake of duct 18 to maintain the elevated temperature of the expanded perlite while it was being sprayed with the emulsion.

Samples of the treated materials obtained from packaged bags were placed in a small glass jar and water was added to about half fill the jar. The jar was sealed and shaken to see if all of the coated particles stayed separated from the water. All of the samples showed clear and complete water separation. A comparison sample obtained with the burner temperature at 927° C., using the same polysiloxane emulsion but sprayed at twice the rate through only one (the downstream) nozzle 30 and without activating the space heater 19 gave rather cloudy water upon mixing, indicating incomplete coating and curing of the perlite.

EXAMPLE 3

Replacing the air duct 18 between collectors 15 and 17 in FIG. 2 with a screw conveyor results in the screw conveyor acting as a heat sink, dropping the temperature through this section to about 90°–93° C. In this case silicone coating is applied at nozzles 28; a lower temperature coating, such as a waxy alkane paraffin, is applied at nozzles 32 and dried and cured without decomposition.

What is claimed is:

1. A process for manufacturing expanded perlite of the type in which
   (a) perlite ore and a stream of hot gases at a temperature above the softening point of perlite are fed to an expansion chamber,
   (b) hot expanded perlite in a stream of hot exhaust gases are withdrawn from the expansion zone and conveyed to a separation zone, and
   (c) expanded perlite is separated from hot exhaust gases;
   the improvement characterized by, intermediate step (b) and step (c), coating the expanded perlite with a hydrophobic material comprising the steps of (1) adjusting the temperature of the exhaust gases to between about 90° C. and about 375° C.; (2) spraying about 0.01% to about 4.0% by weight of hydrophobic coating material onto the expanded perlite, and (3) maintaining the coated perlite at such temperatures for at least about 3 seconds.

2. The process of claim 1 in which in step (2) the coating material is polydimethyl siloxane.

3. The process of claim 1 in which in step (2) the coating material is polydimethyl siloxane sprayed onto perlite that is at a temperature of about 316° C. and in step (3) the coated perlite is conveyed for at least about 5 seconds.

4. The process of claim 1 in which in step (2) the coating material is polydimethyl siloxane, sprayed onto perlite that is at a temperature of about 260° C. and in step (3) the coated perlite is conveyed for at least about 15 seconds.

5. The process of claim 1 in which in step (2) the coating material is polydimethyl siloxane, sprayed onto perlite that is at a temperature of about 205° C. and in step (3) the coated perlite is conveyed for at least about 30 seconds.

6. The process of claim 1 in which in step (2) about 0.1% to about 2% by weight of polydimethyl siloxane is sprayed onto the perlite.

7. The process of claim 1 in which in step (1) the temperature of the exhaust gases is adjusted by the introduction of ambient air.

8. The process of claim 1 in which in step (1) sufficient ambient air is introduced to adjust the temperature of the exhaust gases to about 150°–260° C., and in step (2) about 0.1% to about 2% by weight of polydimethyl siloxane is sprayed onto the perlite.

9. The process of claim 1 in which in step (1) sufficient ambient air is introduced to adjust the temperature of the exhaust gases to about 177° C., and in step (2) about 0.1% to about 2% by weight of polydimethyl siloxane is sprayed onto the perlite.

* * * * *